W. HANNAH.
Horse-Hay Fork.
No. 79,655.
Patented July 7, 1868.
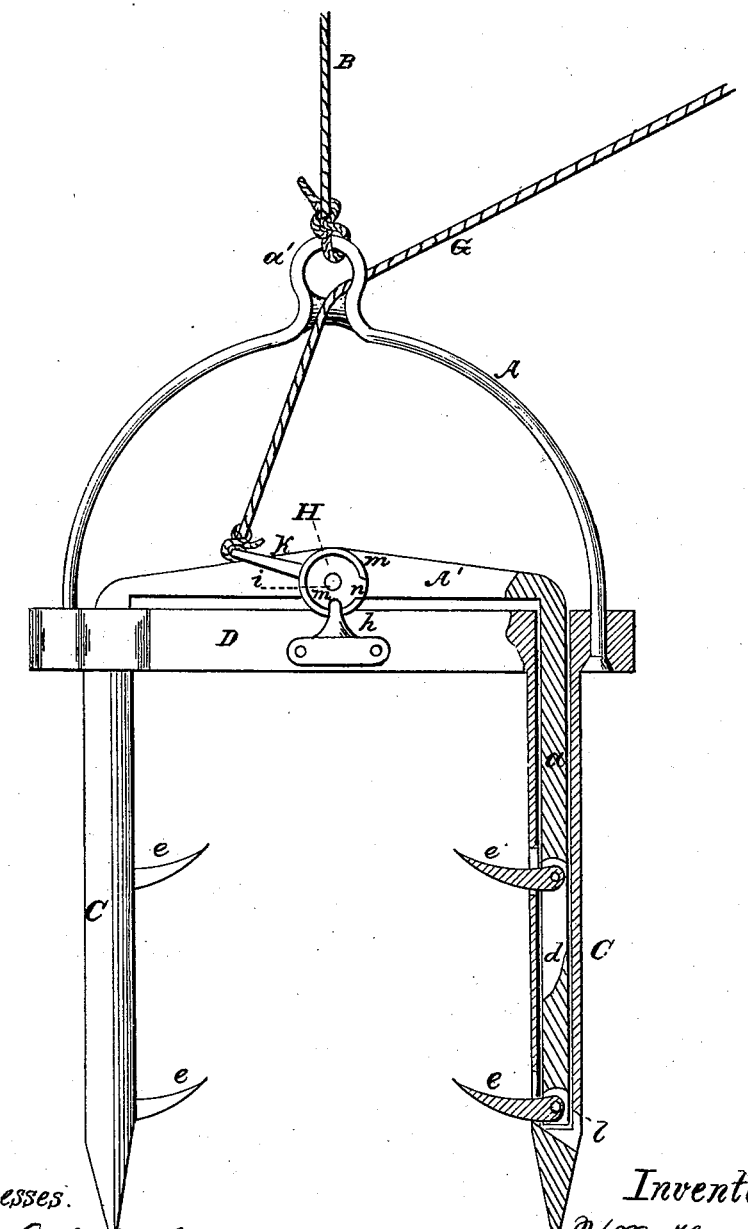

United States Patent Office.

WILLIAM HANNAH, OF MIDDLEFIELD CENTRE, NEW YORK.

*Letters Patent No. 79,655, dated July 7, 1868.*

IMPROVEMENT IN HORSE HAY-FORKS.

*The Schedule referred to in these Letters Patent and making part of the same.*

TO ALL WHOM IT MAY CONCERN:

Be it known that I, WILLIAM HANNAH, of Middlefield Centre, in the county of Otsego, and State of New York, have invented a new and improved Horse-Power Hay-Fork; and I do hereby declare that the following is a full, clear, and exact description thereof, which will enable others skilled in the art to make and use the same, reference being had to the accompanying drawings, forming part of this specification.

This invention relates to a new and improved method of constructing hay-forks for the unloading of hay by the power of a horse, whereby the same is more rapidly and economically done.

It consists of tines attached to the cross-bar, by means of which the whole is raised, moving up and down within two metallic tubes. To the inside of the arms of said tines are pivoted two or more curved hooks to each tine, said hooks passing through slots in said tubes in such way, as by moving said tines upwards in said tubes, the said hooks will be drawn wholly within said tubes.

The drawing is a front view of my invention, portions of the frame and tube being broken away to show the construction.

A is the handle or bail. $a$ are the tines attached to the same. $a'$ is an eye in the bail A. B is a rope, by means of which the fork is raised. $e$ are curved hooks, pivoted to tines $a$. C are tubes, to contain tines $a$, and are continuous with and form a part of a cross-bar, D. The tines $a$ are also rigidly connected by a cross-bar, A.

The bail or handle A' of the fork is affixed to the cross-bar D, as shown. When the fork is thrust down into the hay, the hooks $e$ are retracted within the tubes. The cross-bar A is then pushed down, which forces out the hooks, as shown.

A tripping-plate, H, with a circular flange, $m$, serves to hold the cross-bar A' down and the hooks $e$ protruded, in the manner shown. The gap $n$ in the flange being presented vertically when the cross-bar is thrust down, the hook $h$, bolted to the cross-bar D, enters the said gap, and when the tripping-plate, which turns in a stud, $i$, is turned over, as shown, the flange enters the slot or open part of the hook $h$, and thus holds the two cross-bars together and the hooks $e$ protruded.

When the hay is to be discharged from the fork, the cord or line G, attached to an arm, $k$, forming part of the tripping-plate, is drawn, which brings the gap $n$ around to the hook $h$, and thereby permits the latter to escape therefrom, and the cross-bar being at liberty to move upward will do so, in obedience to the traction of the cord G and the weight of the hay upon the hooks $e$, by which the latter will be easily withdrawn, thereby discharging the hay from the fork.

The lower end of the hollow tines open outward, as shown at $l$, with a slanting bottom, as shown, for the purpose of permitting the egress of any dirt, dust, hay-seed, or the like, which may collect in the tines and tend to impede the operation of the fork. The cross-bar D being of iron, the fork will be stronger and less liable to become strained or broken.

Constructed as above shown and described, it constitutes a strong, simple, and reliable hay-fork, to be operated by horse-power, the advantage of which is that hay is more rapidly and economically handled.

I claim as new, and desire to secure by Letters Patent—

1. The tripping-plate H, substantially as shown and described, in combination with the rigid cross-bar A', of the tines $a$, and the hook $h$, affixed to the cross-bar D of the tubes C C', all as and for the purpose set forth.

2. The discharge-orifice $l$, substantially as shown and described, in combination with the tubes C of a two-tined hay-fork, for the purpose of permitting the escape of the dust or hay-seed, all as set forth.

The above specification of my invention signed by me, this 22d day of November, 1867.

WM. HANNAH.

Witnesses:
WM. F. MCNAMARA,
ALEX. F. ROBERTS.